(12) United States Patent
Perlman et al.

(10) Patent No.: US 6,445,710 B1
(45) Date of Patent: *Sep. 3, 2002

(54) METHOD AND APPARATUS FOR TRANSPARENTLY BRIDGING TRAFFIC ACROSS WIDE AREA NETWORKS

(75) Inventors: Radia Joy Perlman, Acton; William R. Hawe, Pepperell, both of MA (US); John Harper, Golfe Juan (FR)

(73) Assignee: Enterasys Networks, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/247,820

(22) Filed: Feb. 9, 1999

Related U.S. Application Data

(63) Continuation of application No. 07/816,316, filed on Dec. 30, 1991, now Pat. No. 5,870,386.

(51) Int. Cl.$^7$ .............................................. H04L 12/28
(52) U.S. Cl. ...................................... 370/401; 307/408
(58) Field of Search ............................... 370/254, 255, 370/256, 401, 403, 404, 405, 408, 409

(56) References Cited

U.S. PATENT DOCUMENTS

| | | | |
|---|---|---|---|
| 4,706,081 A | 11/1987 | Hart et al. | 340/825.03 |
| 4,797,881 A | 1/1989 | Ben-Artzi | 370/94.1 |
| 4,811,337 A | 3/1989 | Hart | 370/85.13 |
| 4,897,841 A | 1/1990 | Gang, Jr. | 370/85.13 |
| 4,901,312 A | 2/1990 | Hui et al. | 370/85.12 |
| 4,922,503 A | 5/1990 | Leone | 370/85.13 |
| 4,947,390 A | 8/1990 | Sheehy | 370/85.13 |
| 4,953,162 A | 8/1990 | Lyons et al. | 370/94.1 |
| 5,018,137 A * | 5/1991 | Backes et al. | 370/85.13 |
| 5,058,108 A | 10/1991 | Mann et al. | 370/94.1 |
| 5,079,765 A | 1/1992 | Nakamura | 370/85.13 |
| 5,088,032 A | 2/1992 | Bosack | 370/94.1 |
| 5,088,090 A | 2/1992 | Yacoby | 370/85.13 |
| 5,301,273 A * | 4/1994 | Konishi | 395/200 |
| 5,918,022 A * | 6/1999 | Batz et al. | 395/200.66 |
| 6,070,192 A * | 5/2000 | Holt et al. | 709/227 |
| 6,070,246 A * | 5/2000 | Beser | 713/201 |
| 6,092,200 A * | 7/2000 | Muniyappa et al. | 713/201 |
| 6,151,628 A * | 11/2000 | Xu et al. | 709/225 |

FOREIGN PATENT DOCUMENTS

| | | |
|---|---|---|
| EP | 0222584 A2 | 5/1987 |
| EP | 0324277 A2 | 7/1989 |
| EP | 0374883 A2 | 6/1990 |
| WO | WO 90/16026 | 12/1990 |

* cited by examiner

*Primary Examiner*—Huy D. Vu
*Assistant Examiner*—Toan Nguyen
(74) *Attorney, Agent, or Firm*—Wolf, Greenfield & Sacks, P.C.

(57) ABSTRACT

A technique for logically connecting local communications networks (CNs) that may be separated by wide area networks containing routers and other network components. A logical link is formed between two devices called tunnelers, such that, once a tunnel has been established between two CNs, other devices on the CNs can communicate. The tunneling mechanism of the invention requires that each CN have only one active tunneler at any particular time, referred to as the designated tunneler, and each of the tunnelers is configured to have knowledge of the identities of the other tunnelers. A tunnel is established after a successful exchange of messages between two tunnelers, and then traffic may be forwarded through the tunnel in a transparent manner. The tunneling mechanism permits messages to be forwarded between CNs separated by a wide area network containing routers. Moreover, the mechanism permits filtering of traffic, such that only selected types of traffic, or messages for selected destinations or from selected sources, are forwarded through tunnels. The tunneling mechanism inherently precludes the formation of closed communication loops. An alternate embodiment of the invention optimizes the configuration process for particular network topologies.

27 Claims, 4 Drawing Sheets

METHOD AND APPARATUS FOR TRANSPARENTLY BRIDGING TRAFFIC ACROSS WIDE AREA NETWORKS

This application is a continuation of Ser No. 07/816,316 filed Dec. 30, 1991, U.S. Pat. No. 5,870,386.

BACKGROUND OF THE INVENTION

This invention relates generally to interconnected networks of computers and related devices and, more particularly, to techniques facilitating communication between stations connected to widely separated local area networks (LANs). A local area network includes a set of stations or nodes connected to a common communication bus or ring. Typically, all elements of a single LAN are located in a single building or group of buildings. Multiple LANs are often connected together by devices called bridges, to form an extended LAN. A bridge is a device that is connected to more than one LAN, that "listens" to message traffic on each of its LANs, and that forwards the traffic onto selected other LANs. The bridge message forwarding operation is limited by a spanning tree algorithm in which all bridges participate. Messages are forwarded only over a loop-free spanning tree, to avoid closed loops and multiple copies of messages. Message forwarding is further controlled by the bridge's "learning" function. Each bridge learns the directional locations of various stations that are the sources of messages it hears, and "remembers" these locations for future use in forwarding message traffic.

Multiple LANs and extended LANs may also be interconnected to form wide area networks (WANs). The mechanism through which extended LANs are interconnected is typically through devices such as routers. At a broad conceptual level, routers perform a similar task to bridges in that each router is connected to multiple LANs or extended LANs. However, the router operates at a different protocol layer (known as the network layer), and a router can be used for forwarding traffic only if the source of the traffic cooperates by using a network layer protocol that is understood by the router. A bridge, on the other hand, is a packet switch that is "transparent." A station that does not have a network layer protocol, or has a network layer protocol that is not implemented by the router, can use the bridge as a packet switch. Unfortunately, however, bridges have significant drawbacks that preclude their use in many contexts.

The most significant drawback of a bridge, as compared with a router, is that bridges use only a subset of the actual topology of the interconnected networks. In particular, redundant paths cannot be used, because to do so would result in closed loops and unwanted multiplication of message traffic. As already mentioned, to ensure a loop-free topology, bridges participate in a spanning tree algorithm, which establishes a loop-free tree structure. If two extended LANs were to be interconnected by a bridge, the separate spanning trees of the two networks would have to be combined, forming one larger extended LAN. This might not be desirable from a network administration standpoint. Another important disadvantage of bridges is that they cannot forward traffic through a router, because the packets handled by the bridge do not necessarily have the appropriate network layer information needed to utilize the router. Also, since routers do not participate in the spanning tree algorithm, there is a possibility of forming loops in the topology if bridges were to forward traffic through routers.

In summary, neither routers nor bridges provide an ideal solution to the problems of forwarding message traffic over wide-area networks. Some communication protocols cannot work through routers, since routers support only certain network layer protocols. But bridges are limited, by the spanning tree algorithm, to a subset of the overall network topology, and cannot be used to forward traffic through routers that separate LANs. U.S. Pat. No. 5,150,360 issued Sep. 22, 1992, entitled "Utilization of Redundant Links in Bridged Networks" (which is owned by the assignee of the present application), provides for the establishment of point-to-links outside the spanning tree, but still does not permit forwarding of traffic through traditional routers.

What is needed is a new approach that permits traffic to be forwarded transparently across WANs, using more optimal routes and permitting the traffic to traverse traditional routers. The present invention satisfies this need.

Another way of viewing the problem that this invention solves is that, ideally, there should be some way to address messages directly to particular extended LANs. However, the addressing conventions that have evolved for interconnected networks do not include any convenient means for addressing extended LANs. What is needed then, is some way of forwarding a message more directly to the extended LAN in which the message destination is located. The present invention also satisfies this need.

SUMMARY OF THE INVENTION

The present invention resides in a method and apparatus for logically interconnecting local area networks and extended local area networks, even if they are separated by wide area networks having traditional routers.

Briefly, the method of the invention includes the steps of providing a number of devices with the capability to form "tunnels" between LANs that may be widely separated, these special devices being referred to as tunnelers; then electing a unique designated tunneler for each LAN (LAN) for which tunneling is to be provided. Each LAN has no more than one designated tunneler, but a single tunneler may be designated by more than one LAN. The next steps are configuring the tunnelers, by supplying each with information identifying other tunnelers with which a tunnel may be established, establishing at least one tunnel between two designated tunnelers by exchanging messages between the two tunnelers, if the configuration rules state that such a tunnel should exist, and then selectively forwarding message traffic through the established tunnel, from one LAN to another.

In a preferred embodiment of the invention, the step of electing a unique designated tunneler for each LAN includes executing a spanning tree algorithm among all of the devices connected to the LAN, thereby electing a root device. Since not all devices will necessarily have tunnel capability, some adjustment may be needed to device priorities used in the spanning tree algorithm, to ensure that the root device does have tunneling capability. In this way, the election of a designated tunneler is conveniently effected by means of the existing spanning tree algorithm.

The step of configuring the tunnelers includes supplying to each tunneler the identities of other tunnelers and the identities of ports through which the other tunnelers are connected to LANs with which the ports are associated. The step of establishing a tunnel includes transmitting a greeting from a designated tunneler to each other tunneler that is a potential tunnel endpoint, receiving a message from one of the potential tunnel endpoints confirming that a tunnel may be established, and recording the successful establishment of a tunnel. Establishing a tunnel may also include the steps of transmitting a greeting to at least one backup tunneler, after failing to receive a confirming message from the other designated tunneler; then receiving a message from the backup tunneler confirming that a tunnel may be established; and finally recording the successful establishment of the tunnel. The step of selectively forwarding message traffic through the established tunnel includes the steps of receiving a message at a tunneler, and determining whether the message destination is known to the tunneler. If the destination is known, the method further includes the steps of determining whether a tunnel is required to reach this particular destination, and, if so, forwarding the message through the tunnel, if the tunnel has been established and the message is of a type authorized for forwarding through the tunnel.

If the destination is not known, a subsequent step in the method is determining whether the message was received from a tunnel. If so, the message is forwarded through a port defined as the tunnel endpoint. If the message was not received from a tunnel and the message destination is not known, the method further includes forwarding the message over all non-tunnel ports in the spanning tree, except the one through which the message was received, and forwarding the message through all established tunnels, if any, for which this tunneler is a sending endpoint, if the message is of a type authorized for transmission through the tunnel.

Forwarding a message through a tunnel includes the step of appending to the message a destination address comprising the address of a receiving endpoint tunneler of the tunnel, and a port identifier that also defines, in part, the receiving endpoint of the tunnel. Then the message is transmitted through an appropriate port to reach the receiving endpoint of the tunnel. If the message was received from a tunnel, the method further comprises the step of stripping the tunnel receiving endpoint address from the received message, before forwarding it through the tunnel receiving endpoint port.

In an alternate embodiment of the invention, the configuring step is optimized for specific network topologies. In this case the step of configuring includes supplying the tunnelers with a subset of information concerning other tunnelers, the subset of information being-optimized for a particular network topology. The step of establishing a tunnel then includes one or more of the following steps:

(1) for a designated tunneler, sending a greeting to another designated tunneler with which it has been configured, and receiving a response confirming that a tunnel has been established;

(2) for a designated tunneler, sending a greeting to a nondesignated tunneler with which it has been configured, receiving a refusal response identifying a designated tunneler, redirecting the greeting to the designated tunneler identified in the refusal response, and receiving a response confirming that a tunnel has been established; and (3) for a nondesignated tunnerler, periodically transmitting multicast messages identifying the tunnelers with which it has been configured, and, for a designated tunneler, responding to a multicast message from a nondesignated tunneler, by sending a greeting to one of the tunnelers contained in the multicast message, and receiving a response message confirming that a tunnel has been established.

The optimized configuration approach reduces the burden of having to manually configure every tunneler with knowledge of every other tunneler. The cost of this simplification is some added complexity in the establishment of tunnels, but the approach is worthwhile for some network topologies.

It will be understood that the invention also encompasses equivalent apparatus claims similar in scope to the various forms of the method discussed above.

It will be appreciated from the foregoing that the present invention represents a significant advance in the field of communication networks. In particular, the invention provides a novel way of logically interconnecting two LANs, even through they may be separated by wide area networks containing routers. The tunneling protocol of the invention effects this logical interconnection in a manner that permits user controlled filtering of the tunnel traffic, and precludes the formation of any closed loops. Traffic filtering may fulfill any desired network administration objectives, such as limiting traffic flow through a tunnel to selected protocols, or limiting flow through a tunnel to traffic having selected destination or source addresses. Other aspects and advantages of the invention will become apparent from the following more detailed description, taken in conjunction with the accompanying drawings.

DESCRIPTION OF THE PREFERRED EMBODIMENTS

As shown in the drawings by way of illustration, the present invention is concerned with a novel technique for logically interconnecting multiple local area networks (LANs) or extended local area networks (XLANs), which may be separated by wide area networks (WANs) containing traditional routers. Neither routers nor bridges can perform this function in all situations, since routers do not support all communications protocols, and bridges are limited by the spanning tree algorithm and cannot forward traffic through traditional routers.

In accordance with the invention, each LAN or XLAN has a bridge-like device that is designated as the "tunneler" for that network, and logical connections, called tunnels, are established between pairs of tunnelers. Each such pair of tunnelers functions in much the same way as a bridge, in the sense that traffic is forwarded transparently from one network to another. Each tunneler has a connection to the LAN or XLAN of which it is the designated tunneler, and at least one connection to a WAN that separates the LANs or XLANs.

Figure 1:
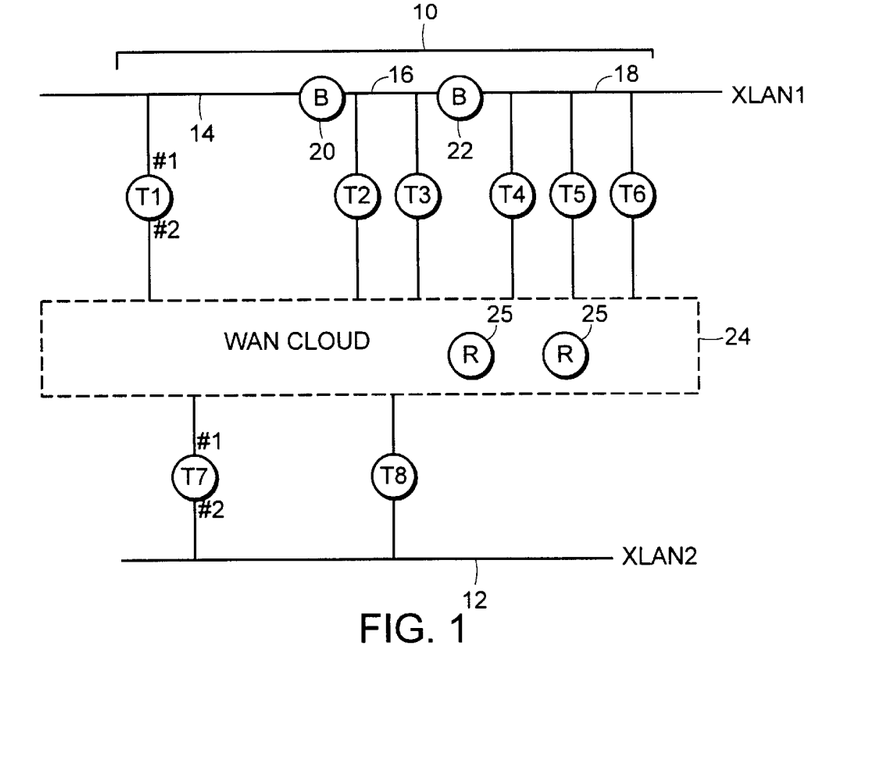
FIG. 1 is a simplified schematic diagram of one example of a network topology having multiple tended local area networks (LANS) that are connected through a wide area network (WAN) having conventional routers.

FIG. 1 is one example, in simplified form, of a network topology in which the invention may be used. The topology includes two extended LANs 10, 12, indicated as XLAN1 and XLAN2. XLAN1 has three LANs 14, 16, 18 connected by bridges B, indicated at 20, 22. XLAN2 12 is a single LAN. The rest of the topology is a WAN 24, referred to as a "WAN cloud." This includes any combination of LANs, point-to-point links, bridges, and routers. The WAN cloud 24 handles message traffic in accordance with conventional routing protocols, for instance (but not restricted to) the Open Systems Interconnection (OSI) Reference Model, developed by the International Standards Organization (ISO). The problem with which the invention is concerned is how to establish a communication link between XLAN1 and XLAN2, such that traffic can be forwarded through the WAN cloud 24, as optimally as possible, even if the source or destination of the traffic is not operating in accordance with the routing protocols in the WAN cloud. In this illustration, XLAN1 is connected to the WAN cloud 24 by six "tunnelers" indicated as T1, T2, T3, T4, T5, and T6, and XLAN2 is connected to the WAN cloud by two tunnelers T7 and T8. Tunneler T1 is connected to LAN 14, tunnelers T2 and T3 are connected to LAN 16, and tunnelers T4, T5 and T6 are connected to LAN 18. Each tunneler may be considered as performing in some ways like a bridge, but having additional tunneling capability, to be described in detail below.

The tunneling capability involves a preliminary procedure for establishing tunnels, and then a traffic handling procedure whereby traffic may be forwarded through the established tunnels. Establishing the tunnels is effected by two basic steps. First, a procedure is used to ensure that there is only one designated tunneler for each LAN or extended LAN under consideration. Second, the designated tunnelers are manually "configured" by an operator or network manager, to define the tunnels that can be established for each pair of LANs or extended LANs.

Although each LAN or extended LAN has only one designated tunneler, the same tunneler may perform the function of designated tunneler for more that one LAN or extended LAN. This point is not clear from FIG. 1 but will become apparent from a later example.

There are two alternatives for ensuring that each LAN or XLAN has only one designated tunneler. The first alternative, and probably the easiest to implement, is to use the same procedure that the spanning tree algorithm uses to elect a root bridge. In the spanning tree algorithm, a single bridge is elected and designated the "root bridge" for each extended LAN, to ensure that interconnected bridges in the extended LAN form a loop-free topology. If the same procedure is used to elect a tunneler, it must be used in such a way as to ensure that the elected bridge has tunneling capability. If only some of the bridges participating in the spanning tree algorithm have tunneling capability, some adjustment would need to be made to bridge priorities used in the spanning tree algorithm, to ensure that the bridge elected as the root bridge also has tunneling capability. Using the spanning tree algorithm to elect a designated tunneler has the advantage that the procedure already exists and is utilized by bridges in the network. Moreover, the spanning tree algorithm operates effectively even in periods of heavy traffic congestion.

The alternative to using an existing spanning tree algorithm to designate a tunneler is to implement a special election process among the potential tunnelers in each extended LAN. This algorithm could be closely duplicative of the spanning tree algorithm, wherein each tunneler transmits a previously assigned priority, and a collective election process eliminates all but one of the tunnelers. This has some disadvantages associated with the implementation of a special election procedure, principally additional cost and complexity. Moreover, there is no guarantee that such a procedure would work effectively in heavy traffic conditions. Since multicast messages look like ordinary data packets, and compete with other data packets for access to the network, election messages may be discarded under some conditions.

The other preliminary task is to configure, by network management, the tunnelers with the definitions of tunnels that should be built. For example, in FIG. 1, if the designated tunneler for XLAN1 is T1 and the designated tunneler for XLAN2 is T7, the tunnel between XLAN1 and XLAN2 would be defined by the network layer address of each end-point of the tunnel and by the port through which the end-point is connected to the appropriate XLAN. If T1 is connected to XLAN1 by its #1 port, and T7 is connected to XLAN2 by its #2 port, the complete definition of the tunnel is (T1, 1), (T7,2). T1 is configured with a corresponding tunnel definition as seen from the T1 end, i.e. (1,T7,2) Tunneler T7 is configured with a tunnel definition as seen from the T7 end, i.e. (2,T1,1).

Configuration optionally involves two other types of information. First, alternate tunnel definitions may be configured into the tunnelers. For example, T1 may be configured to use T8 as an alternate tunnel end-point, in the event that T7 is not available for some reason.

The second type of additional configuration data includes a definition of the types of messages that will be forwarded over each tunnel. The tunnel may be used for only selected protocols, or for all types of traffic, or for traffic involving only selected destinations or sources, all at the option of the network manager.

After election of a designated tunneler for each LAN or extended LAN, and configuration of the designated tunnelers, tunnels are established by an exchange of messages between tunnelers that have been defined as tunnel end-points. For example, T1, having been configured to establish a tunnel to T7, will send a greeting message through the WAN cloud 24, addressed to T7. In essence, the greeting indicates that T1 wishes to establish a tunnel with T7. T7 sends a reply message, either assenting to the establishment of a tunnel, or indicating that it (T7) is not the designated tunneler for the requested port, or indicating that it (T7) has not been configured for this tunnel. Another possibility is that T7 cannot be reached for some reason, and no reply is received by T1. This exchange may take place in the opposite direction, depending on timing considerations. Or there may be a symmetrical exchange, with both tunnelers sending messages to their opposite numbers in the defined tunnel.

After a tunnel is established, such as the tunnel T1–T7, it functions in a similar fashion to a bridge connecting the two XLANs. When tunneler T1 "hears" a message on XLAN1, T1 forwards the message through the tunnel to tunneler T7, after first appending the network layer address for T7. On receiving such a message, tunneler T7 strips off the network layer address and forwards the message onto XLAN2. Traffic may also be transmitted through the tunnel in the opposite direction by the same mechanism.

The tunnelers have a bridge-like capability of learning the locations of stations from which messages have come. Each message has a source address, in the form of a data link layer address. When tunneler T1, for example, receives traffic through its #1 port, this traffic can be identified as having a source address in the direction of XLAN1. A subsequent message having a destination address that corresponds with a source address previously noted as emanating from XLAN1, need not be forwarded through the tunnel to T7.

However, when the direction of a destination address is not known to the tunneler, the message is forwarded through the established tunnel to XLAN2.

Figure 2:
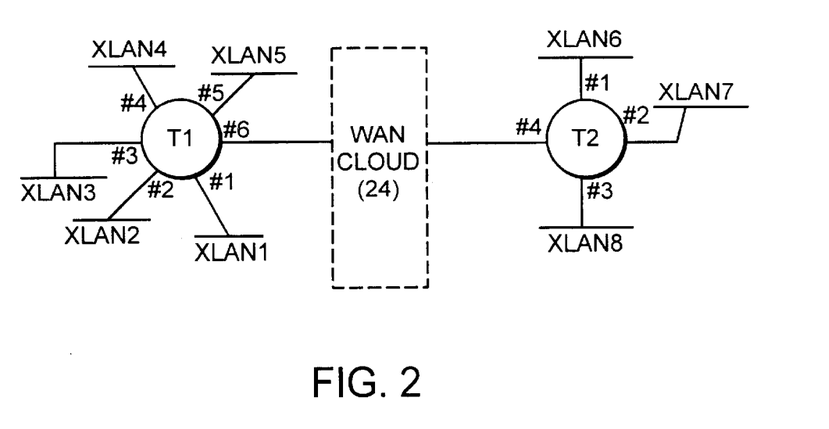
FIG. 2 is a diagram similar to FIG. 1, but showing a different topology example.

FIG. 2 depicts another example of a topology, having a WAN cloud 24, two tunnelers T1 and T2, and a total of eight extended LANs, indicated as XLAN1 through XLAN8. XLAN1 through XLAN5 are connected to tunneler T1 through its ports #1 through #5, and XLAN6 through XLAN8 are connected to tunneler T2 through its ports #1 through #3. Tunneler T1 is connected through its additional port #6 to the WAN cloud 24 and tunneler T2 is connected to the WAN cloud through its additional port #4. T1 is the designated tunneler for extended LANs XLAN1 through XLAN5, and T2 is the designated tunneler for extended LANs XLAN6 through XLAN8. Tunnelers T1 and T2 may be configured to establish as many as fifteen tunnels between various pairs of XLANs connected to different tunnelers. For example, the tunnels from XLAN1 will be configured as:

(1,T2 1), for tunneling from XLAN1 to XLAN6,
(1,T2,2), for tunneling from XLAN1 to XLAN7, and
(1,T2,3), for tunneling from XLAN1 to XLAN8.

Four additional sets of three tunnels can be configured with XLAN2 through XLAN5 as the starting points. Additional tunnels may be established between pairs of XLANs connected to the same tunneler, such as XLAN4 and XLAN5. There are ten possible additional tunnels using only T1 for both tunnel endpoints, and three possible additional tunnels using T2 for both tunnel endpoints. Although XLAN4 and XLAN5, for example, can be connected using T1 as a conventional bridge, a tunnel may be a more desirable solution because it provides a convenient mechanism for filtering traffic between the two XLANs. Moreover, if the two XLANs are conventionally bridged by T1, their spanning trees will necessarily have to be merged and this may not be desirable.

For purposes of illustration, the WAN cloud 24 in FIGS. 1 and 2 has been shown as being separate from the other extended LANs in the topology. In general, however, the principles of the invention discussed above also apply if the cloud is considered to encompass the extended LANs between which the tunnels are established.

The requirement that there be only one designated tunneler for each extended LAN leads to a desirable, and not immediately obvious, property of networks connected by tunnels. When tunnels are established in accordance with the invention, there is no possibility of closed loops being formed by any interconnection of the tunnels. This property can be understood from the further example of FIG. 3, which shows a topology including four extended LANs, XLAN1 through XLAN4, each of which has a designated tunneler T1 through T4, respectively. The established tunnels include T1–T2, T2–T4, T3–T4 and T3–T1, which form the sides of a square, together with T1–T3 and T2–T4, which form the diagonals of the square. At first sight, it might appear that a message could be circulated around the sides of the square in a closed loop, and that unwanted duplicate messages would be generated.

Figure 3:
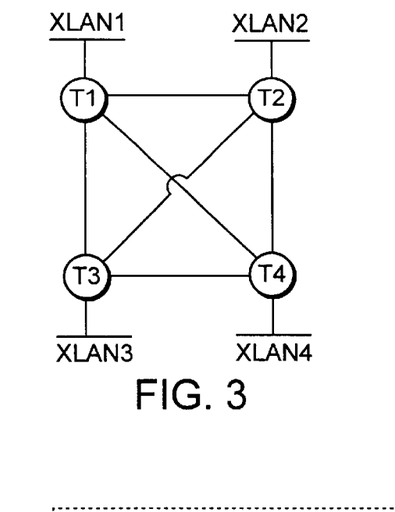
FIG. 3 is a diagram similar to FIG. 1, but showing yet another topology example.

Suppose a message from XLAN1 is to be forwarded by tunneler T1, and that the destination is unknown to T1. T1 will forward the message over its three established tunnels, T1–T2, T1–T3 and T1–T4. If, for example, the message destination is on XLAN3, it will be forwarded there via tunnel T1–T3. Tunneler T2 will also receive a copy of the message, through tunnel T1–T2, but will not forward the message through a second tunnel, such as T2–T3. There is only one established tunnel between T1 and T3, and that is the "diagonal" tunnel T1–T3. Each tunneler is conditioned to operate such that traffic received through one tunnel should not be forwarded through another. Since there is only one designated tunneler for each extended LAN, this rule is simple to put into effect.

Figure 4:
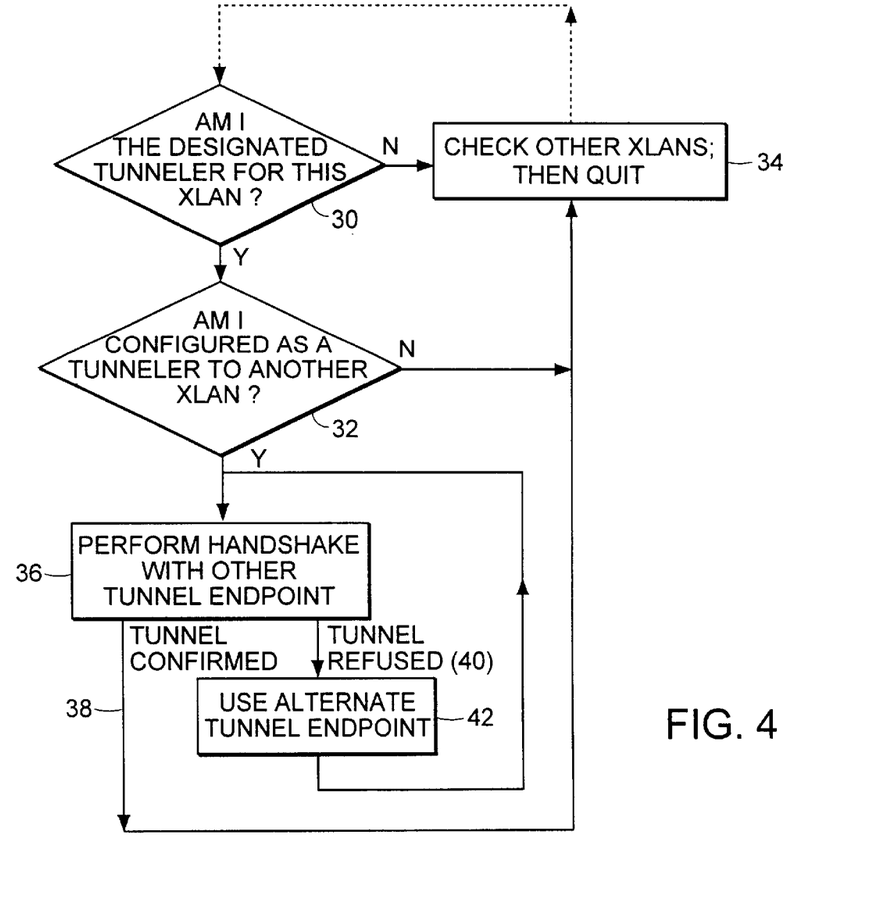
FIG. 4 is a flowchart depicting the operations performed in establishing tunnels.

The procedure performed by each tunneler in establishing tunnels is shown in simplified flowchart form in FIG. 4. The tunneler first determines if it is the uniquely designated tunneler for a particular extended LAN (XLAN), as indicated in block 30, and then determines whether this tunneler has been configured as a tunneler to another XLAN, as indicated in block 32. If the answer to either of these questions is negative, the tunneler shifts its attention to other XLANs to which it may be connected (block 34) and repeats the questions of blocks 30 and 32. If the tunneler is a designated tunneler for a particular XLAN and has been configured as a tunneler to some other XLAN, the next step is to perform a communications "handshake" with the tunneler that has been configured as the other endpoint of the tunnel. The handshake, indicated in block 36, may take any of several forms, but two possible results of the handshake are that the establishment of tunnel is confirmed, as indicated by line 38 from block 36, or that the establishment of the tunnel is refused for some reason, as indicated by line 40. In the latter case, there may be subsequent communication with an alternate tunnel endpoint, if one has been specified by configuration, as indicated in block 42. In any event, after establishment of a tunnel has been confirmed or refused, the tunneler repeats this entire process for other XLANs to which it may connected, as indicated in block 34.

Figure 5:
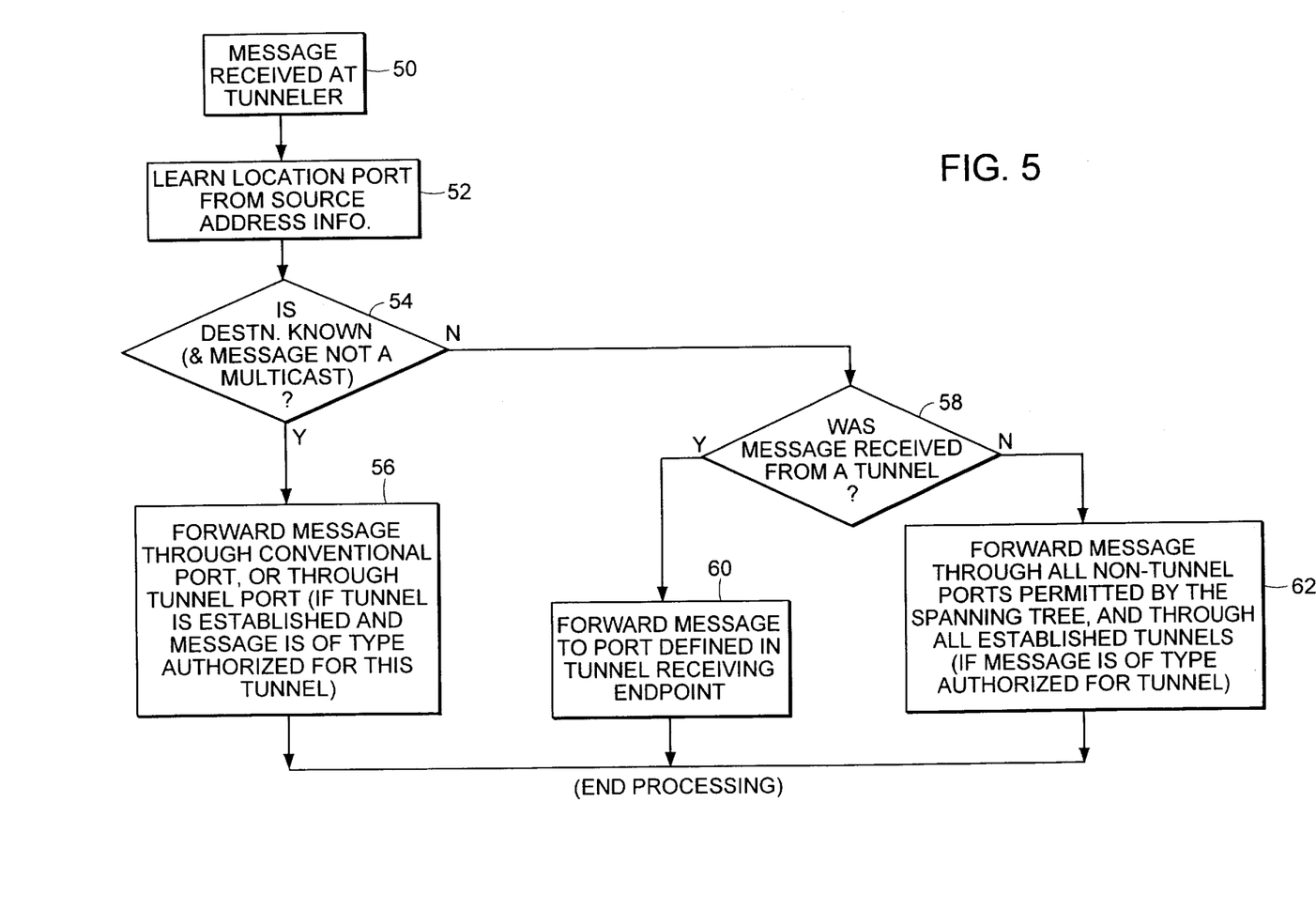
FIG. 5 is a flowchart depicting the operations performed by a tunneler in processing and forwarding received messages.

The operations performed by a tunneler in forwarding messages are summarized in FIG. 5. Like a bridge, a tunneler has multiple ports that are connected to separate LANs or XLANs. In addition to its physical ports, a tunneler may be considered to have a "tunneler port" for each established tunnel for which the tunneler serves as an end-point. When a message is received at a tunneler, as indicated at 50, the source address of the message is noted, in conjunction with the port from which the message was received, and a database of addresses and their port locations is developed. This learning function, indicated in block 52, includes learning the locations of addresses in terms of their corresponding "tunnel ports" of the tunneler.

If the destination of the received message is known from prior message activity, as determined in block 54, the identity of the port through which the message should be forwarded is already known, and the message may be forwarded, as indicated in block 56. The destination may, for example, be located on a LAN that is directly connected to the tunneler, in which case the message can be forwarded through the appropriate non-tunnel port. If the known destination may be reached through an established tunnel, and if the message is of a type that has been authorized for forwarding through a tunnel, then the message is forwarded through the established tunnel. This requires that a network layer address be appended to the message, giving the address of the receiving end-point of the tunnel. Then the message is forwarded through the tunnel.

If the destination of the received message is not known, the tunneler next determines whether the message was received from a tunnel, as indicated in block 58. If so, the message is simply forwarded through the appropriate port that has been designated as the tunnel receiving end-point, as indicated in block 60. The message, having been received from a tunnel, is not forwarded through any other tunnels, and the possibility of closed loops is avoided. If the received message was not received from a tunnel, and its destination is unknown, it should be forwarded through all non-tunnel ports permitted by the spanning tree, and through all tunnel ports, i.e., through all tunnels for which the tunneler is functioning as an end-point, as indicated in block 62. In forwarding through the tunnel ports, the tunneler must first check that the tunnels have been established and that the message is of a type authorized for forwarding through tunnels.

The foregoing description is not intended to preclude the possibility of a tunnel being established between two extended LANs connected to the same tunnel, i.e., where one tunneler is used as both endpoints of a tunnel, but using different ports, of course. Although this type of interconnection could be handled by the conventional bridge function, the tunnel mechanism provides the additional capability of filtering traffic in some desired way, such that only certain categories will be allowed to pass through the tunnel. Also, as noted earlier, using the tunneling mechanism avoids having to merge the spanning trees of the two bridged networks.

The tunneling mechanism described above works to advantage in any of a variety of network configurations. In particular, the use of tunnels in accordance with the invention allows traffic to be bridged from one extended LAN to another, even when an interposed WAN includes routers. Considered from another perspective, the invention provides a means for addressing extended LANs. Conventional communications protocols provide no means for addressing LANs and extended LANs, but the invention achieves this objective since a designated tunneler and an associated port are unique to a LAN or extended LAN. Thus, the tunneler-port identification also identifies the LAN. Moreover, tunneling is achieved by a mechanism that precludes the formation of undesirable closed loops, allows grouping of tunnelers to designate alternates, and can make use of an existing spanning tree algorithm to elect a designated tunneler for each extended LAN.

Tunnel configuration, in accordance with the invention as described thus far, requires each potential tunneler to be configured with a knowledge of all of the other potential tunnelers. For example, in the topology of FIG. 1, each of the six tunnelers connected to XLAN1 has to be configured with knowledge of the two tunnelers connected to XLAN2 and each of the two tunnelers connected to XLAN2 has to be configured with knowledge of all six of the tunnelers connected to XLAN1. In total there will be 2×6 pieces of configuration information for the FIG. 1 topology. In an alternate embodiment of the invention, the amount of configuration information can be reduced, or optimized, based on knowledge of the specific network topology in which the invention is being used. An example of a topology in which such an optimization scheme could be used is shown in FIG. 6.

Figure 6:
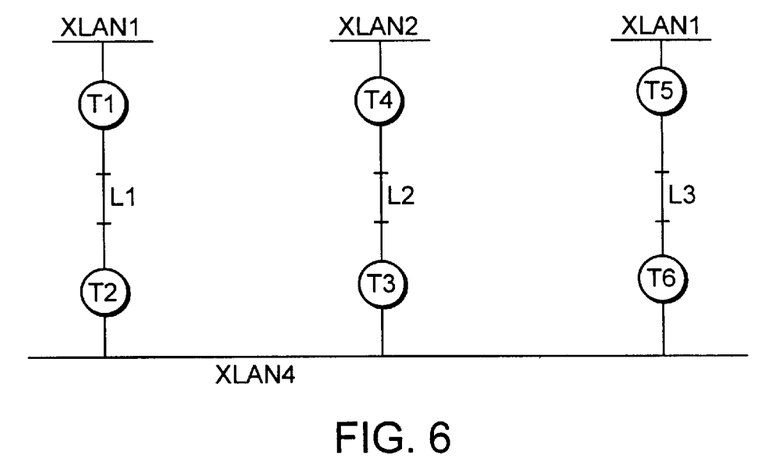
FIG. 6 is diagram similar to FIGS. 1–3, but showing another topology, in which a configuration optimization is employed.
Figure 7:
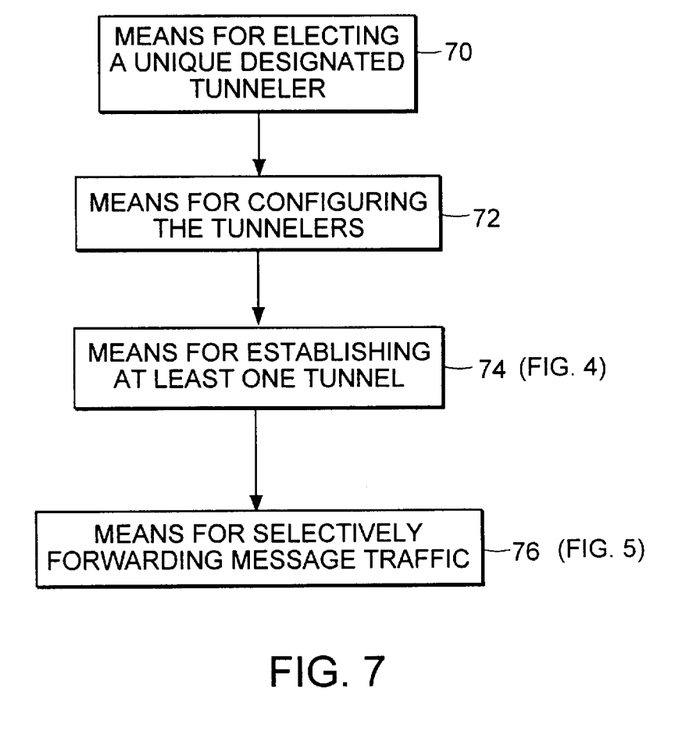

FIG. 6 shows four extended LANs, designated XLAN1, XLAN2, XLAN3 and XLAN4. XLAN1 is connected to a tunneler T1, which is connected to another tunneler T2 through a point-to-point link L1. The tunneler T2 is connected by another port to XLAN4. Similarly, XLAN2 is connected to XLAN4 through a path comprising tunneler T4, link L2, and tunneler T3. Finally, XLAN3 is connected to XLAN4 through a path comprising tunneler T5, link L3, and tunneler T6. The links L1, L2, L3, may be considered a special case of the WAN shown in FIG. 1. In the configuration of FIG. 6, it is further assumed that there is a desire to build tunnels from XLAN4 to each of the other extended LANs, XLAN1, XLAN2 and XLAN3.

In accordance with this embodiment of the invention, every tunneler does not have to be configured with information concerning every other possible tunneler. For example, in the network configuration of FIG. 6 it would only be necessary to configure a tunnel between T1 and T2 (for XLAN1–XLAN4), another tunnel between T3 and T4 (for XLAN2–XLAN4), and another tunnel between T5 and T6 (for XLAN3–XLAN4). There is no point in configuring T1 with knowledge of T3 and T6, because the latter two tunnelers cannot be reached from T1 if T2 is inoperative. Of course, this arrangement using three tunnelers connected with XLAN4 is inconsistent with the notion that there is only one tunneler for each XLAN.

In this optimization approach of the invention, there are three possible ways that a tunneler would know whether to build a tunnel. The first is the manual configuration technique as described for the basic form of the invention. Thus, if T2 were the designated tunneler for XLAN4, the tunnel from T1 to T2 would be established as a result of this basic manual configuration technique. The second technique is by multicast advertisement, and the third is by redirection, both of which need further explanation.

A multicast message is one directed to multiple destinations. In the second technique for establishing tunnels, if a tunneler is not elected the designated tunneler for a particular XLAN, it periodically multicasts the set of tunnels with which it has been manually configured. Thus, T3, which is not the designated tunneler, would advertise by multicast messages that it had been configured to form a tunnel with T4. The designated tunneler T2, upon hearing of the advertised T3–T4 tunnel from T3's multicast, establishes a second tunnel, between T2 and T4. This would certainly not be an optimally routed tunnel. A message from XLAN4 bound for XLAN2 would proceed to tunneler T2, which would forward the message to the other tunnel endpoint, T4, but through XLAN4 and T3. Similarly, tunneler T6 would advertise a tunnel from T6 to T5, with which it had been configured, and the designated tunneler would receive T6's multicast advertisement and establish a tunnel from T2 to T5.

Tunnel establishment by redirection occurs when a tunneler attempts communication with a tunneler that has not been elected the designated tunneler. The return message from the non-designated tunneler includes the identity of the designated tunneler, so the tunneler attempting communication is made aware which tunneler, and which of its ports on that XLAN, will accept the tunnel request. A simple protocol is provided, to require the designated tunneler to advertise its identity, including a port number, to others on the same XLAN. For example, tunneler T5 has been configured to establish a tunnel with T6, but T6 is not the designated tunneler. A response message from T6, redirects T5 to the designated tunneler T2. T6 has knowledge of the designated tunneler T2 from "advertising" messages it has previously received from T2. Similarly, tunneler T3 redirects T4 to the designated tunneler T2. Communication in a direction toward XLAN4 is also non-optimal. For example, a message from XLAN3 over tunnel T5–T2 is constrained to first visit the designated tunneler T2, which is reached through XLAN4, before returning to XLAN4 for delivery to its final destination.

The advantage of optimization by this approach is that the storage and time requirements for manual configuration are greatly reduced. The trade-offs for this improvement are that message routing is likely to be further removed from optimal, and the approach is not universally applicable to all network configurations.

It will be appreciated from the foregoing the present invention represents a significant advantage in the field of interconnected local area networks (LANs). In particular, the invention permits LANs to be bridged together through an established communications tunnel even when they are separated by network components that include routers. Each tunnel established in accordance with the invention provides for user-specified filtering, wherein traffic flowing through the tunnel may be limited, at the user's option, to specific categories or protocols, or may be limited in other ways, such as by source or destination. As described, the tunnel mechanism of the invention inherently precludes closed loops in the interconnected network. The basic tunneling approach provides for grouping of tunnelers to define alternatives in the event of an inoperative tunneler. In the optimization approach described, manual tunneling configuration is greatly reduced for some network configurations. It will also be appreciated that, although a basic embodiment and a specifically optimized version of the invention have been described in detail for purposes of illustration, various modifications may be made without departing from the spirit and scope of the invention. Accordingly, the invention is not to be limited except as by the appended claims.

What is claimed is:

1. A method for logically connecting communications networks (CNs) interconnected by network components, the method comprising:

selecting network components to provide tunnels between CNs said selected network components being referred to as tunnelers;

electing a designated tunneler for each CN for which tunneling is to be provided, with each CN having no more than one designated tunneler and a single tunneler being designated by at least one CN;

configuring the designated tunneler by supplying the designated tunneler with information identifying other designated tunnelers;

establishing at least one tunnel between two of said CNs through said designated tunneler and at least one of said other designated tunnelers, by exchanging messages between the designated tunneler and said at least one other designated tunneler; and selectively forwarding message traffic through the established tunnel, from one CN to another CN by appending to a message a destination address that includes the address of a receiving endpoint tunneler of the tunnel, and also includes a port identifier that defines, in part, the receiving endpoint of the tunnel.

2. The method as recited in claim 1, wherein the step of electing a designated tunneler for each CN provides a single tunneler designated to only one CN and further comprises:

electing a root network component by executing a spanning tree algorithm among all of the network components connected to the CN; and ensuring that the root network component has tunneling capability.

3. The method as recited in claim 1, wherein the step of configuring the tunnelers includes:

supplying to each tunneler information corresponding to the identities of other tunnelers and the identities of ports of said other tunnelers through which the other tunnelers are connected to CNs with which they are associated.

4. The method as recited in claim 3, wherein the step of establishing at least one tunnel includes:

transmitting a greeting from a designated tunneler to each other tunneler that is a potential tunnel endpoint;

receiving a message from one of the potential tunnel endpoints confirming that a tunnel is established; and recording that said tunnel has been established.

5. The method as recited in claim 1, wherein configuring the tunnelers includes:

supplying to each tunneler the identities of other tunnelers, the identities of ports through which the other tunnelers are connected to CNs with which they are associated, and an indication of tunneler priorities, to facilitate establishment of tunnels between tunnel endpoints.

6. The method as recited in claim 5, wherein establishing at least one tunnel includes:

transmitting a greeting from a designated tunneler to another designated tunneler that is a potential tunnel endpoint;

receiving a message from the other designated tunneler confirming that a tunnel is established; and recording that said tunnel has been established.

7. The method as recited in claim 5, wherein establishing at least one tunnel includes:

transmitting a greeting from a designated tunneler to another designated tunneler that is a potential tunnel endpoint;

transmitting, after failing to receive a confirming message from the other designated tunneler, a greeting to at least one backup tunneler;

receiving a message from the backup tunneler confirming that a tunnel is established; and recording that a tunnel has been established.

8. The method as recited in claim 1, wherein selectively forwarding message traffic through the established tunnel includes:

receiving a message having a message destination at a tunneler;

determining whether the message destination is known to the tunneler; and if the destination is known, performing the steps of:

determining whether the destination requires forwarding through a tunnel, and if so, forwarding the message through the tunnel, if the tunnel has been established and the message is of a type authorized for forwarding through the tunnel;

if the destination is not known, determining whether the message was received from a tunnel;

if the message was received from a tunnel, forwarding the message through a port defined as the tunnel endpoint;

if the message was not received from a tunnel and the message destination is not known, performing the steps of:

forwarding the message over all permissible non-tunnel ports; and forwarding the message through all established tunnels, if any, for which this tunneler is a sending endpoint, if the message is of a type authorized for tunnel transmission.

9. The method as recited in claim 8, wherein forwarding a message through a tunnel includes:

transmitting the message through an appropriate port to reach the receiving endpoint of the tunnel.

10. The method as recited in claim 9, wherein if the message was received from a tunnel the method further comprises:

stripping, from the received message, the tunnel receiving endpoint address, before forwarding the message through the tunnel receiving endpoint port.

11. The method as recited in claim 8, wherein selectively forwarding messages through a tunnel includes:
   updating, if necessary, a database of destinations, by means of address information obtained from each message source.

12. The method as recited in claim 1, wherein configuring includes:
   supplying the tunnelers with a subset of information concerning other tunnelers, the subset of information being selected for optimal operation of a particular network topology; and
   the step of establishing a tunnel includes the steps of:
   (1) for a first designated tunneler, sending a greeting to another designated tunneler with which it has been configured, and receiving a response confirming that a tunnel has been established,
   (2) for said designated tunneler, sending a greeting to a nondesignated tunneler with which it has been configured, receiving a refusal response identifying a second designated tunneler, redirecting the greeting to the second designated tunneler identified in the refusal response, and receiving a response confirming that a tunnel has been established, and
   (3) for said nondesignated tunneler, periodically transmitting multicast messages identifying the tunnelers with which it has been configured, and, for said designated tunneler, responding to a multicast message from a nondesignated tunneler, by sending a greeting to one of the tunnelers contained in the multicast message, and receiving a response message confirming that a tunnel has been established.

13. A method for logically connecting communications networks (CNs) interconnected by network components, the method comprising:
   selecting a plurality of network components to provide tunnels between CNs, said selected plurality of network components being referred to as tunnelers;
   electing a unique designated tunneler for each CN for which tunneling is to be provided, with each CN having no more than one designated tunneler and a single tunneler being designated by one CN;
   configuring the designated tunneler by supplying the designated tunneler with the identities of other designated tunnelers and the identities of ports through which the other tunnelers are connected to CNs with which they are associated;
   establishing at least one tunnel between at least two of said designated tunnelers, by transmitting a greeting from a first designated tunneler to each other tunneler that is a potential tunnel endpoint, receiving a message from one of the potential tunnel endpoints confirming that a tunnel is established, and recording that a tunnel has been established; and
   selectively forwarding message traffic through the established tunnel, from one CN to another CN by appending to a message a destination address that includes the address of a receiving endpoint tunneler of the tunnel, and also includes a port identifier that defines, in part, the receiving endpoint of the tunnel.

14. The method as recited in claim 13, wherein selectively forwarding message traffic through the established tunnel includes:
   receiving a message having a message destination at a tunneler;
   determining whether the message destination is known to the tunneler; and if the destination is known, performing the steps of:
      determining whether the destination requires forwarding through a tunnel, and if so, forwarding the message through the tunnel, if the tunnel has been established and the message is of a type authorized for forwarding through the tunnel;
   if the destination is not known, determining whether the message was received from a tunnel;
   if the message was received from a tunnel, forwarding the message through a port defined as the tunnel endpoint;
   if the message was not received from a tunnel and the message destination is not known, performing the steps of:
      forwarding the message over all non-tunnel ports except the one through which the message was received, and
      forwarding the message through all established tunnels, if any, for which this tunneler is a sending endpoint, if the message is of a type authorized for tunnel transmission.

15. The method as recited in claim 14, wherein forwarding a message through a tunnel includes:
   transmitting the message through an appropriate port to reach the receiving endpoint of the tunnel.

16. The method as recited in claim 15, wherein if the message was received from a tunnel, the method further comprises:
   stripping, from the received message, the tunnel receiving endpoint address, before forwarding the message through the tunnel receiving endpoint port.

17. Apparatus for logically connecting communications networks (CNs) interconnected by network components, the apparatus comprising:
   a plurality of network components disposed between interconnected CNs, said plurality of network components being referred to as tunnelers;
   means for electing a unique designated tunneler for each CN from a corresponding one of said plurality of tunnelers for which tunneling is to be provided, with each CN having no more than one designated tunneler and a single tunneler being designated by one CN;
   means responsive to information identifying other tunnelers, for configuring the tunnelers with which a tunnel is established;
   means responsive to messages exchanged between at least two tunnelers, for establishing at least one tunnel between said at least two tunnelers; and
   means contained within each tunneler, for selectively forwarding message traffic through the established tunnel, from one CN to another CN by appending to a message a destination address that includes an address of a receiving endpoint tunneler of the tunnel, and also includes a port identifier that defines, in part, the receiving endpoint of the tunnel.

18. The apparatus as recited in claim 17, wherein the means for electing a unique designated tunneler for each CN include:
   means for executing a spanning tree algorithm among all of the network components connected to the CN and for electing a root network component in accordance with said spanning tree algorithm; and
   means for ensuring that the root network component has tunneling capability.

19. The apparatus as recited in claim 17, wherein the means for configuring the tunnelers include:
   means for supplying to each tunneler identities of other tunnelers and identities of ports through which the other tunnelers are connected to CNs with which they are associated.

20. The apparatus as recited in claim 19, wherein the means for establishing at least one tunnel include:

means for transmitting a greeting from a designated tunneler to each other tunneler that is a potential tunnel endpoint;

means for receiving a message from one of the potential tunnel endpoints confirming that a tunnel is established; and means for recording that said tunnel has been established.

21. The apparatus as recited in claim 17, wherein the means for configuring the tunnelers include:

means for supplying to each tunneler the identities of other tunnelers, identities of ports through which the other tunnelers are connected to CNs with which they are associated, and an indication of tunneler priorities, to facilitate establishment of tunnels between tunnel endpoints.

22. The apparatus as recited in claim 20, wherein the means for establishing at least one tunnel include:

means for transmitting a greeting from a designated tunneler to another designated tunneler that is a potential tunnel endpoint;

means for receiving a message from the other designated tunneler confirming that a tunnel is established; and means for recording that said tunnel has been established.

23. The apparatus as recited in claim 20, wherein the means for establishing at least one tunnel include:

means for transmitting a greeting from a designated tunneler to another designated tunneler that is a potential tunnel endpoint;

means for transmitting, after failing to receive a confirming message from the other designated tunneler, a greeting to at least one backup tunneler;

means for receiving a message from the backup tunneler confirming that a tunnel is established; and means for recording that said tunnel has been established.

24. The apparatus as recited in claim 17, wherein the means for selectively forwarding message traffic through the established tunnel include:

means for receiving a message having a message destination at a tunneler;

means for determining whether the message destination is known to the tunneler;

means, operative if the destination is known, for determining whether the destination requires forwarding through a tunnel, and if so, forwarding the message through the tunnel, if the tunnel has been established and the message is of a type authorized for forwarding through the tunnel;

means, operative if the destination is not known, for determining whether the message was received from a tunnel;

means, operative if the message was received from a tunnel, for forwarding the message through a port defined as the tunnel endpoint;

means, operative if the message was not received from a tunnel and the message destination is not known, for forwarding the message over all permissible non-tunnel ports, and for forwarding the message through all established tunnels, if any, for which this tunneler is a sending endpoint, if the message is of a type authorized for tunnel transmission.

25. The apparatus as recited in claim 24, wherein the means for forwarding a message through a tunnel include:

means for transmitting the message through an appropriate port to reach the receiving endpoint of the tunnel.

26. The apparatus as recited in claim 25, further comprising:

means, operative if the message was received from a tunnel, for stripping from the received message the tunnel receiving endpoint address, before forwarding the message through the tunnel receiving endpoint port.

27. The apparatus as recited in claim 17, wherein the means for configuring include:

means for supplying the tunnelers with a subset of information concerning other tunnelers, the subset of information being selected for optimal operation of a particular network topology; and the means for establishing a tunnel include:

(1) for a first designated tunneler, means for sending a greeting to another designated tunneler with which it has been configured, and for receiving a response confirming that a tunnel has been established, (2) for said designated tunneler, means for sending a greeting to a nondesignated tunneler with which it has been configured, means for receiving a refusal response identifying a second designated tunneler, means for redirecting the greeting to the second designated tunneler identified in the refusal response, and means for receiving a response confirming that a tunnel has been established, and (3) for said nondesignated tunneler, means for periodically transmitting multicast messages identifying the tunnelers with which it has been configured, and, for said designated tunneler, means for responding to a multicast message from a nondesignated tunneler, by sending a greeting to one of the tunnelers contained in the multicast message, and means for receiving a response message confirming that a tunnel has been established.

* * * * *

UNITED STATES PATENT AND TRADEMARK OFFICE
CERTIFICATE OF CORRECTION

PATENT NO. : 6,445,710 B1 Page 1 of 1
DATED : September 3, 2002
INVENTOR(S) : Perlman et al.

It is certified that error appears in the above-identified patent and that said Letters Patent is hereby corrected as shown below:

<u>Title page,</u>
Item [63], should read as shown below:
-- [63]  Continuation of application No. 08/780,654, filed on Jan. 6, 1997, now Pat. No. 6,097,705. --
Item [30], Foreign Application Priority Data should be added and should read as shown below:
-- [30]        Foreign Application Priority Data
Jan. 9, 1991  (UK)        9100389.7 --

Signed and Sealed this

Twenty-first Day of January, 2003

JAMES E. ROGAN
*Director of the United States Patent and Trademark Office*